United States Patent
Pregmon

[11] 3,882,064
[45] May 6, 1975

[54] EPOXY RESIN POWDER COATING COMPOSITION

[75] Inventor: Walter Pregmon, Broomall, Pa.

[73] Assignee: E. I. du Pont de Nemours and Company, Wilmington, Del.

[22] Filed: Dec. 27, 1973

[21] Appl. No.: 428,724

[52] U.S. Cl. .............. 260/28; 117/21; 117/132 BE; 260/17.2; 260/18 PN; 260/31.8 E; 260/37 AL; 260/830 TW
[51] Int. Cl. .............................................. C08g 51/52
[58] Field of Search......... 260/28, 18 PN, 37 AL, 830 TW, 260/17.2, 31.8 E

[56] References Cited
UNITED STATES PATENTS

| | | | |
|---|---|---|---|
| 3,028,251 | 4/1962 | Nagel | 117/21 |
| 3,419,412 | 12/1968 | Morris et al. | 260/28 |
| 3,420,794 | 1/1969 | May | 260/28 |
| 3,532,655 | 10/1970 | Radlove | 260/28 |
| 3,624,180 | 11/1971 | Schmid et al. | 260/28 |
| 3,634,322 | 1/1972 | Ruf | 260/28 |
| 3,732,286 | 5/1973 | Son et al. | 260/28 |
| 3,484,398 | 12/1968 | Childs | 260/28 |

OTHER PUBLICATIONS
Lee et al., Handbook of Epoxy Resins, 1967, 9–5 and 10–6 relied upon

*Primary Examiner*—Melvyn I. Marquis

[57] ABSTRACT

The powder coating composition comprises finely divided particles that have a diameter of 1–100 microns wherein the powder particles are an intimately mixed blend of
A. an epoxy resin of the formula

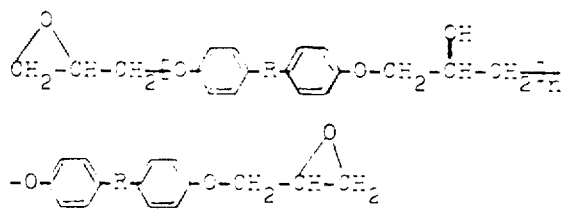

wherein R is an alkylene group of 1–4 carbon atoms and n is a positive integer;
B. a second epoxy resin of said formula but different from (A);
C. a polyethylene wax;
D. a catalyst of tri(dimethyl aminomethyl)phenol or a fatty acid salt thereof; and
E. dicyandiamide.

The composition is useful as a coating for exteriors or interiors of food and beverage containers and for appliances such as refrigerators, dishwashers, washers, and dryers and the like.

5 Claims, No Drawings

EPOXY RESIN POWDER COATING COMPOSITION

BACKGROUND OF THE INVENTION

This invention is related to a powder coating composition and in particular to a thermosetting powder coating composition containing an epoxy resin.

Epoxy resin powder coating compositions are well known in the art, as shown by Nagel U.S. Pat. No. 3,028,251, issued Apr. 3, 1962; Haag U.S. Pat. Nos. 3,338,863, issued Aug. 29, 1967 and 3,645,960, issued Feb. 29, 1972. However, these powder coating compositions do not have the rapid rate of cure required by the appliancemanufacturing industry; nor do these compositions meet the approval of the Food and Drug Administration for food contact use, such as for use as protective coatings for food and beverage containers.

The novel powder coating composition of this invention cures at a rapid rate and is formulated with components which are approved for food contact use by the Food and Drug Administration.

SUMMARY OF THE INVENTION

The thermosetting powder coating composition of this invention comprises finely divided particles having a particle size of 1–100 microns; the powder particles are an intimate blend of the following constituents:

A. 65.50–98.05 percent by weight of an epoxy resin of the formula

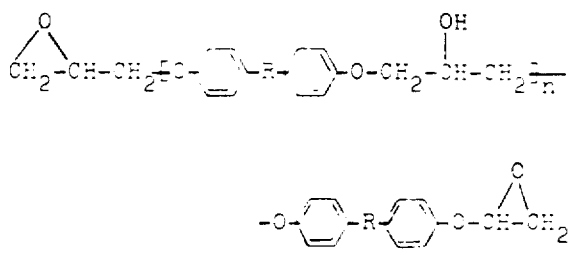

where R is an alkylene group having 1–4 carbon atoms and n is a positive integer sufficiently large to provide a resin with a Gardner Holdt Viscosity of L-W measured at 40 percent polymer solids in diethylene glycol n-butyl ether at 25°C and having an epoxide equivalent of 700–1200;

B. 0–25 percent by weight of a second epoxy resin different from (A) and of said formula wherein R is said alkylene group and n is a positive integer sufficiently large to provide a resin with a Gardner Holdt Viscosity of K-S measured as above and having an epoxide equivalent of 600–850;

C. 0.1–2 percent by weight of a polyethylene wax having a molecular weight of 1000–3000;

D. 0.05–0.50 percent by weight of a catalyst of tri(dimethyl aminomethyl)phenol or the fatty acid salts thereof; and E. 1.8–7.0 percent by weight of dicyandiamide.

DESCRIPTION OF THE INVENTION

The novel powder coating composition of this invention has a powder particle size preferably of 10–75 microns in diameter and more preferably 20–55 microns in diameter.

The novel composition can be pigmented or unpigmented but is usually pigmented and contains pigments in a pigment-to-binder ratio of 2/100 to 65/100. Any of the conventional inorganic pigments, organic pigments, filler pigments and dyes can be used.

About 65.50–98.05 percent by weight of the novel powder coating composition is an epoxy resin of the formula

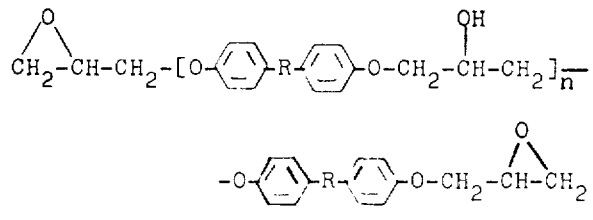

where R is an alkylene group of 1–4 carbon atoms, n is a positive integer sufficiently large to provide a Gardner Holdt Viscosity of L-W measured at 40 percent polymer solids in diethylene glycol n-butyl ether at 25°C and the resin has an epoxide equivalent of 700–1200. The epoxide equivalent is the grams of resin that contain one gram equivalent of epoxide.

Preferably, about 72.6–90.0 percent by weight of the epoxy resin is used in the novel powder coating composition. In one particularly preferred resin which forms a high-quality product, R is an isopropylidene group and the resin has a Gardner/Holdt Viscosity measured as above of R-V and has an epoxide equivalent of 875–975.

About 0–25 percent by weight of a second epoxy resin is used in the novel composition which is different from the above epoxy resin. This second epoxy resin has the same formula as the above resin and has a Gardner/Holdt Viscosity measured as above of K-S and an epoxide equivalent of 600–850. Preferably, about 5.6–20.0 percent by weight of this epoxy resin is used and in one particularly preferred resin R is an isopropylidene group and the resin has a Gardner/Holdt Viscosity of K-P and an epoxide equivalent of 660–810.

The novel composition contains about 0.1–2 percent by weight of a polyethylene wax having a molecular weight of about 1000–3000. Preferably, about 0.3–1.0 percent by weight of the polyethylene wax is used having a molecular weight of about 1500–2500.

The novel composition contains 1.8–7.0 percent by weight of dicyandiamide curing agent. Preferably, about 4–6 percent by weight of dicyandiamide is used. To improve the handling characteristics of the dicyandiamide, the compound can be blended with finely divided silica. For example, a blend in a ratio of 95/5 of dicyandiamide to silica can be used.

A curing catalyst in the amount of 0.05–0.50 percent by weight is used in the novel composition. Preferably, about 0.1–0.4 percent by weight of the catalyst is used. The catalyst is tri(dimethyl aminoethyl) phenol or its fatty acid salts. Typical fatty acid salts that can be used are tri(dimethyl aminoethyl)phenol caprate, tri(-dimethyl aminoethyl)phenol caprylate, tri(dimethyl aminoethyl)phenol isodecanoate, tri(dimethyl aminoethyl)phenol linoleate, tri(dimethyl aminoethyl)phenol naphthenate, tri(dimethyl aminoethyl)phenol neodecanoate, tri(dimethyl aminoethyl)-phenol octoate, tri(dimethyl aminoethyl)phenol 2-ethyl hexoate, tri(dimethyl aminoethyl)phenol oleate, tri(dimethyl aminoethyl)phenol palmitate, tri(dimethyl aminoethyl)phenol resinate, tri(dimethyl aminoethyl)-phenol resinoleate, tri(dimethyl aminoethyl)phenol soyate, tri(dimethyl aminoethyl)phenol stearate, tri(dimethyl aminoethyl)phenol tallate and the like.

Flow control agents can be added to the novel powder coating composition of this invention in amounts of about 0.1–1.0 percent by weight. Typical flow control agents are polyacrylates such as poly-2-ethylhexyl acrylate, finely divided ethyl cellulose, methyl phenol silicone having a viscosity about 300 centistokes and the like.

To improve the handling properties of the novel powder coating composition and to prevent caking, finely divided silica in the amounts of 0.05–0.5 percent by weight can be added. The silica can be blended with any of the epoxy resins or as mentioned before with the dicyandiamide.

One particularly preferred composition consists essentially of
- A. 72.6–90.0 percent by weight of an epoxy resin having the aforementioned formula wherein R is an isopropylidene group and wherein the resin has a Gardner/Holdt Viscosity of R-V and an epoxide equivalent of 875–975;
- B. 5.6–20.0 percent by weight of a second epoxy resin having the aforementioned formula wherein R is an isopropylidene group and wherein the resin has a Gardner/Holdt Viscosity of K-P and an epoxide equivalent of 660–810;
- C. 0.3–1.0 percent by weight of polyethylene wax having a molecular weight of 1500–2500 and a melting point of 100°–110°C;
- D. 0.1–0.4 percent by weight of a catalyst of tri(-dimethyl aminoethyl)phenol; and
- E. 4.0–6.0 percent by weight of dicyandiamide.

Examples of the great variety of pigments that can be used in the novel powder coating composition are as follows: metallic oxides such as titanium dioxide, zinc oxide, iron oxide, and the like; metallic flakes such as aluminum flake; metallic powders; metal hydroxides; "Afflair" pigments - for example, mica flake coated with titanium dioxide; sulfides; sulfates; carbonates carbon black; silica; talc; china clay; and other extender pigments.

If the novel powder coating composition is to be in contact with foods, only those pigments and additives which have Food and Drug Administration approval are used.

One method for forming the novel powder coating composition of this invention is to blend the constituents together and then pass this mixture through a conventional extruder. The extrudate then is reduced to a powder using conventional grinding equipment; for example, a pin disc mill, a fluid energy mill, or a hammer mill can be used. After grinding, the powder is passed through a sieve to remove large particles. Usually a 200 mesh sieve (74 microns) is used.

APPLICATION OF THE NOVEL POWDER COATING COMPOSITION

The novel powder coating composition of this invention can be applied to a metal, glass, plastic, or fiber reinforced plastic substrate by electrostatic spraying techniques or by using a fluidized bed or an electrostatic fluidized bed. Preferably, electrostatic spraying is utilized in which a voltage of 20–100 kilovolts is applied to the gun. The composition is applied in several passes to provide a thickness after fusion of 1.5–4.0 mils, preferably, 1.8–3.0 mils, and then baked at 180°–200°C. for 8–15 minutes to fuse the powder particles into a continuous uniform finish.

The novel powder coating composition can be applied directly to untreated metals such as aluminum or steel. In one particular application, the powder is applied directly to the exterior or to the interior of aluminum cans.

The novel coating composition of this invention can be applied over a suitably treated or primed metal substrate. Typical alkyd primers or epoxy primers pigmented with iron oxide, carbon black, titanium dioxide and the like can be used. Also, the novel composition can be used directly over galvanized or phosphatized steel to form a durable coating. An electrically conductive carbon black pigment can be added to the primer to make the surface conductive and promote uniform deposition of the powder while spraying.

Electrodeposited primers can be used on the metal substrate. Typical electrodeposited primer compositions have as the film-forming constituents about 50–95 percent by weight of a carboxylic acid polymer having an acid number of 5–200 and, correspondingly, about 5–50 percent by weight of a cross-linking agent.

The following are examples of carboxylic polymers used in these primer compositions: maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as drying oil fatty acids; esterified epoxy resins such as an epoxy-hydroxy polyether resin esterified with conventional drying oil fatty acid which can be further acidified with maleinized drying oils; acrylic polymers; polyesters; trimellitic anhydride alkyd resins; styrene/allyl alcohol copolymers reacted with a carboxylic acid constituent and the like.

The following are typical cross-linking agents used with the above carboxylic polymers to form conventional primers and primers that can be electrodeposited: melamine formaldehyde, alkylated melamine formaldehyde, urea formaldehyde, benzoguanamine formaldehyde, toluene sulfonamide resins; one preferred cross-linking agent is hexa(methoxymethyl) melamine. Other cross-linking agents such as amines and other compatible hydroxyl-terminated compounds can also be used.

The following Example illustrates the invention. All quantities are on a weight basis unless otherwise indicated.

EXAMPLE 1

The following ingredients are blended together:

| | Parts By Weight |
|---|---|
| Epoxy resin (having the formula 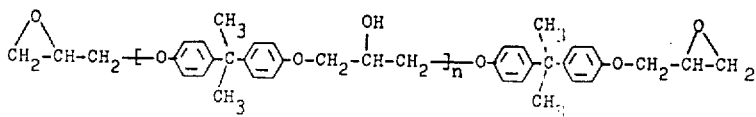 where n is a positive integer sufficiently large to provide a Gardner/Holdt Viscosity of R-V measured at 40% polymer solids in diethylene glycol n-butyl ether at 25°C. and having an epoxide equivalent of 875-975) | 84.0 |
| Epoxy resin (the epoxy resin is of the above formula and has a Gardner/Holdt Viscosity of K-P measured as above and an epoxide equivalent of 660-810) | 16.0 |
| Ethyl cellulose (finely divided) | 1.6 |
| Polyethylene wax having a molecular weight of 2000 and melting point of 105°C. | 0.5 |
| Curing Agent (95/5 blend of dicyandiamide and finely divided silica) | 5.2 |
| Catalyst [ 2,4,6-tri(dimethyl aminoethyl)phenol-2-ethylhexoate ] | 0.4 |
| Titanium dioxide pigment | 60.0 |
| Total | 167.7 |

The above mixture is charged into a melt extruder and extruded at 90°-110°C. The extrudate is then cut into pellets and charged into a grinding mill and ground. The powder then is passed through a 200 mesh sieve to remove large particles.

The powder is then sprayed onto the exterior of an aluminum can and onto a phosphatized 24 gauge cold roll steel panel using a Model 322 Ransburg electrostatic powder gun. The powder is delivered from a reservoir to the gun by means of an air stream. The gun utilizes 60 volts of the electricity to charge the powder particles and 60 pounds per square inch air pressure. The can and panel then are baked for 12 minutes at 182°C. The resulting film is smooth and even and has an excellent appearance and is free from popping and cratering. The film thickness is about 1.8-2.2 mils.

The coated steel panel has a Tukon hardness of 16-22 knoops measured according to ASTM-D-1478-62T; a 60° angle gloss of above 85 units measured according to ASTM-Method D-523-67 and an impact flexibility of 60 inch-pounds using a Gardner impact tester No. 16-1120 with ⅝ inch diameter plunger and accompanying receptacle.

A powder coating composition identical to the above is prepared except a 2,2,6-tri(dimethyl aminoethyl) phenol catalyst is used in place of the above catalyst. The powder coating composition is of a high quality and forms a finish having about the same physical properties as set forth above.

Another powder coating composition identical to the above is prepared except a methyl phenol silicone having a viscosity above 300 centistokes is used in place of the ethyl cellulose. The resulting powder coating composition is of a high quality and forms a finish with excellent physical properties.

A third powder coating composition is formulated identical to the above except a 2,4,6-tri(dimethyl aminoethyl) phenol catalyst is used instead of the above catalyst and a polyacrylate having a S.U.S. viscosity at 100°C. of 5000 and a refractive index at 25°C. of 1.413 to 1.4191 measured in 40 percent solids in 2,2,4-trimethyl pentane is used in place of the ethyl cellulose.

The polyacrylate is believed to be poly-2-ethylhexyl acrylate. The resulting powder coating composition is of a high quality and forms a finish having physical properties similar to those of the above finish.

I claim:

1. A powder coating composition comprising finely divided particles having a particle size of 1-100 microns; wherein the powder particles are an intimately mixed blend of a binder consisting essentially of A. 72.6–90.0 percent by weight of an epoxy resin of the formula

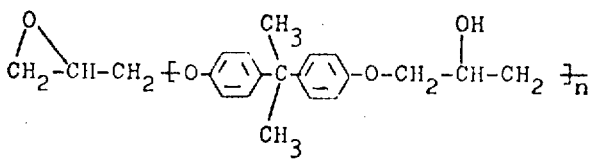

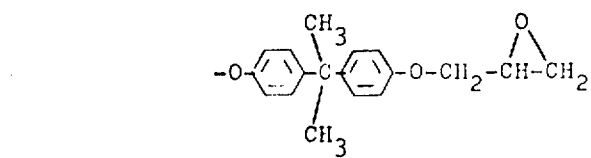

wherein n is a positive integer sufficiently large to provide a Gardner Holdt Viscosity of R-V measured at 40 percent polymer solids in diethylene glycol n-butyl ether at 25°C. and having an epoxide equivalent of 875–975;

B. 5.6–20.0 percent by weight of a second epoxy resin of said formula wherein n is a positive integer sufficiently large to provide a Gardner Holdt Viscosity of K-P measured as above and having an epoxide equivalent of 660–810;

C. 0.3–1.0 percent by weight of polyethylene wax having a molecular weight of 1000–3000;

D. 0.1–0.4 percent by weight of a catalyst of tri(-dimethyl aminoethyl)phenol; and E. 4.0–6.0 percent by weight of dicyandiamide.

2. The powder coating composition of claim 1 containing pigment in a pigment/binder ratio of 2/100 to 65/100.

3. The powder coating composition of claim 1 containing 0.1-1.0% by weight of a flow-control agent of ethyl cellulose, polyacrylate or methylphenol silicone.

4. The powder coating composition of claim 3 in which the flow control agent is a polyacrylate.

5. The powder coating composition of claim 1 containing 0.05-0.5 percent by weight of finely divided silica.

* * * * *